(12) United States Patent
Roarty et al.

(10) Patent No.: US 7,442,287 B2
(45) Date of Patent: Oct. 28, 2008

(54) MATERIAL SURFACE TREATMENT METHOD USING CONCURRENT ELECTRICAL, VIBRATIONAL AND PHOTONIC STIMULATION

(75) Inventors: Brian P. Roarty, 522 Outlook Dr., Los Altos, CA (US) 94024; Carol J. Walker, Redmond, WA (US)

(73) Assignee: Brian P. Roarty, Los Altos, CA (US)

( * ) Notice: Subject to any disclaimer, the term of this patent is extended or adjusted under 35 U.S.C. 154(b) by 364 days.

(21) Appl. No.: 11/413,485

(22) Filed: Apr. 28, 2006

(65) Prior Publication Data

US 2008/0237056 A1 Oct. 2, 2008

Related U.S. Application Data

(60) Provisional application No. 60/676,188, filed on Apr. 29, 2005.

(51) Int. Cl.
*C25B 1/00* (2006.01)
*C25B 1/02* (2006.01)

(52) U.S. Cl. ........................ 205/340; 205/341; 205/687; 205/704

(58) Field of Classification Search ................. 205/340, 205/341, 687, 704
See application file for complete search history.

(56) References Cited

U.S. PATENT DOCUMENTS 4,167,461 A * 9/1979 Dickson et al. ............. 205/340

4,790,916 A * 12/1988 Murphy et al. .............. 205/340
2005/0199747 A1 9/2005 Roarty

FOREIGN PATENT DOCUMENTS

WO WO2004044923 A1 5/2004

OTHER PUBLICATIONS

C.J. Stephanson et al., "Synthesis of a Novel Anionic Hydride Organosiloxane Presenting Biochemical Properties", Int'l Assoc. for Hydrogen Energy, 28, 2003, pp. 1243-1250.

* cited by examiner

*Primary Examiner*—Arun S Phasge
(74) *Attorney, Agent, or Firm*—Schneck & Schneck; Thomas Schneck

(57) ABSTRACT

A method of preparing a material surface, such as palladium, to facilitate desirable reactions, especially exothermic reactions in a liquid medium, involves placing the material whose surface is to be treated into an electrolytic cell as at least one of the electrodes and then concurrently stimulating the material electrically, vibrationally and photonically. The electrolytic cell includes a solution in water of an electrolyte, a siliceous surfactant and a pH-adjusting agent, all heated and maintained at or just below its boiling point. A series of voltage pulses are applied to the electrodes over an extended time period while also being illuminated with intensity-modulated light pulses. The material surface thus treated exhibits crater sites and silica coatings, evidencing a change in bonding of the palladium surface, as well as a sustained exothermic reaction.

29 Claims, 10 Drawing Sheets

Fig._1

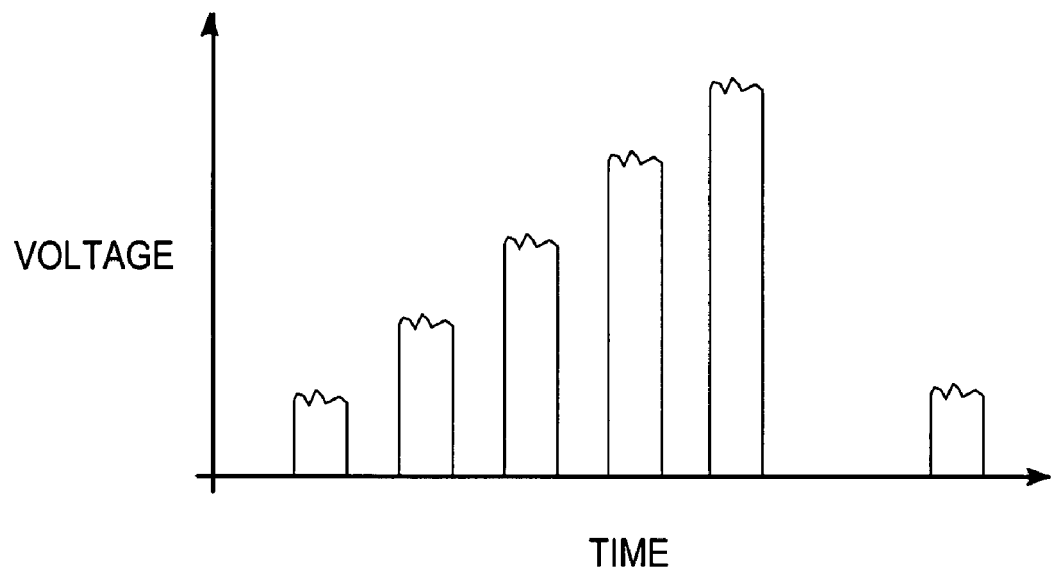
Fig._2
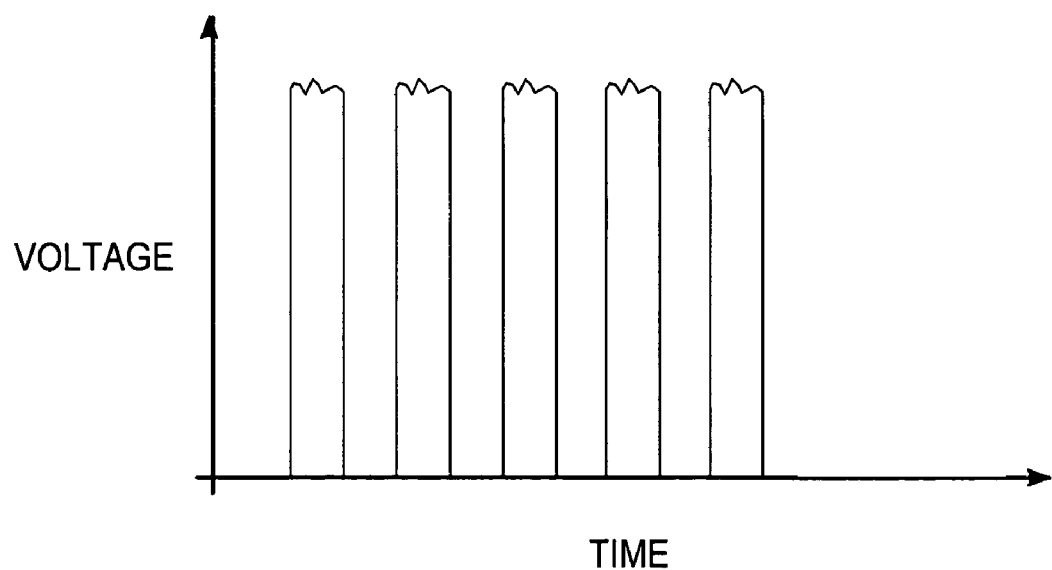
Fig._3

Fig._4

Fig._5

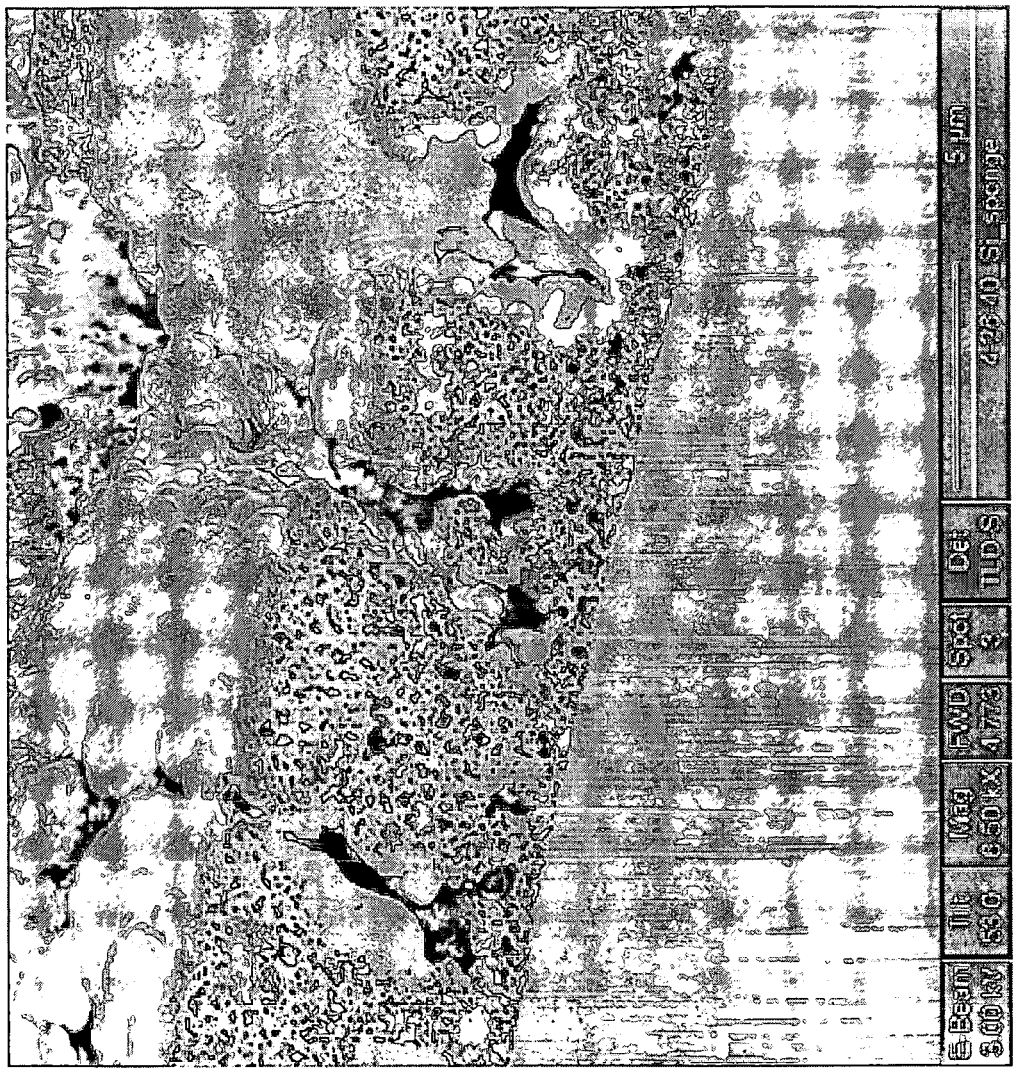
Fig._6

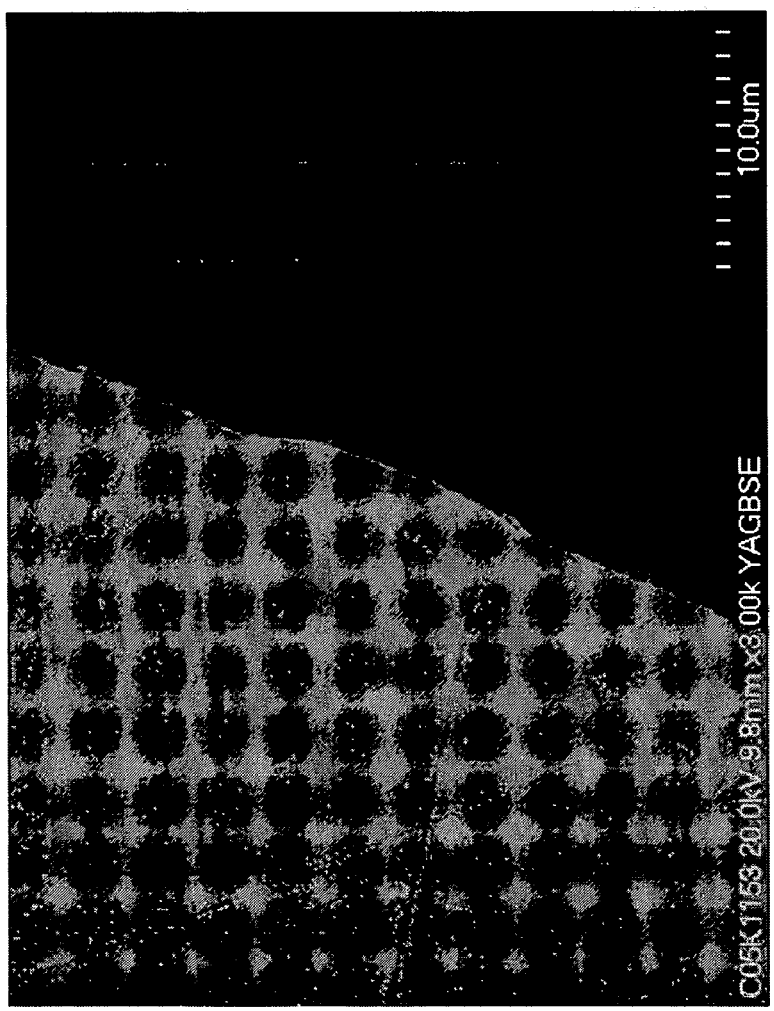
Fig. _ 7

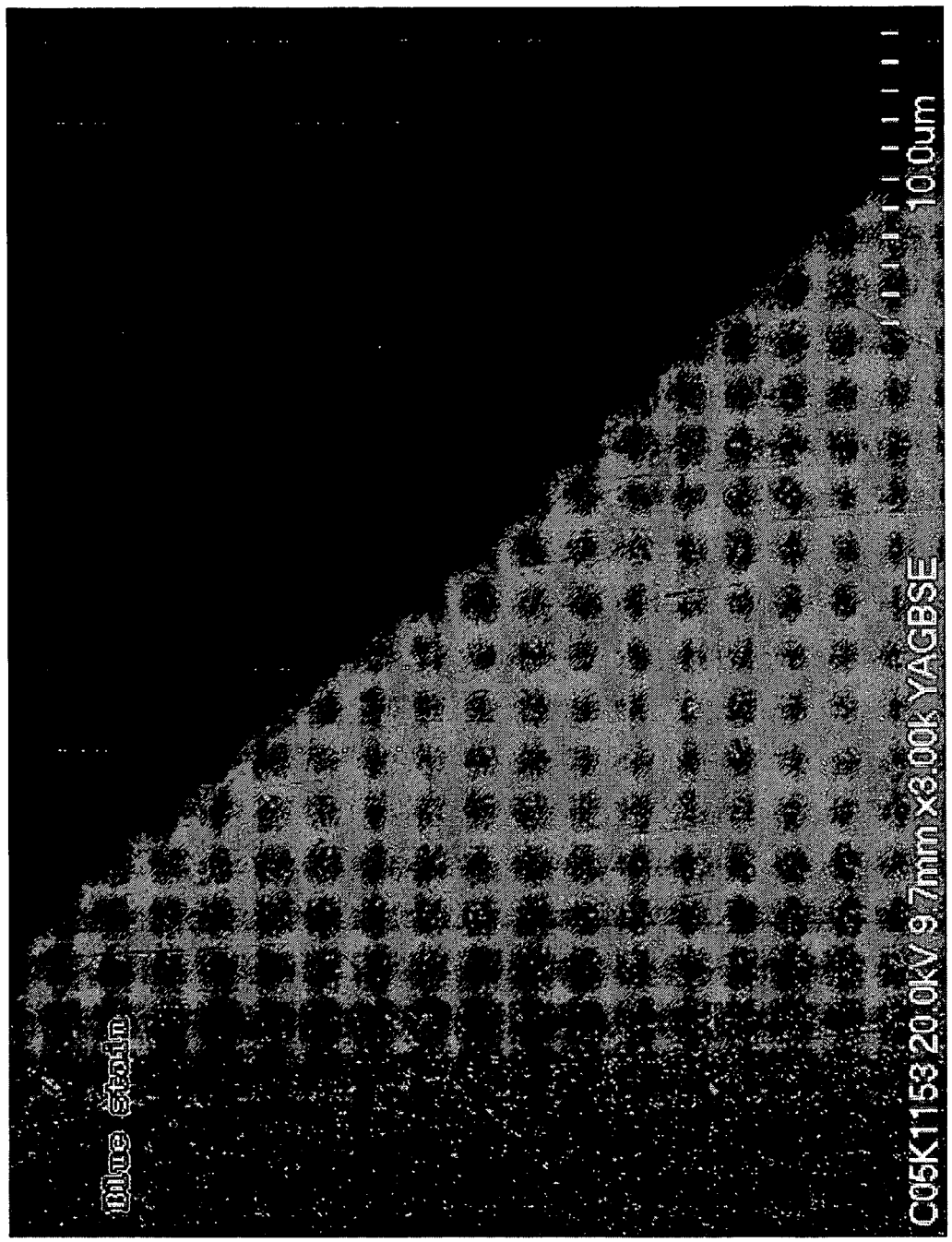
Fig. _ 8

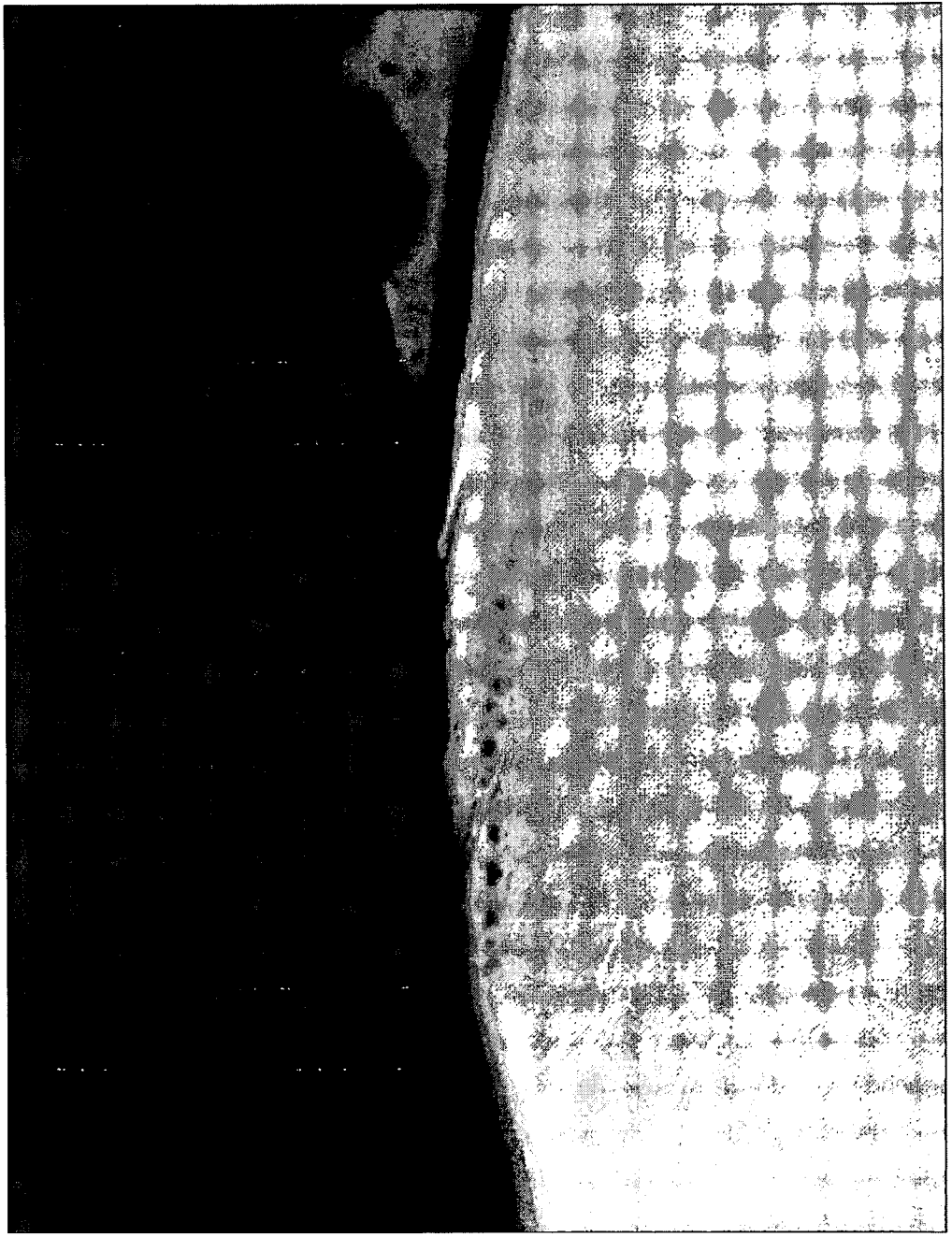
Fig._9

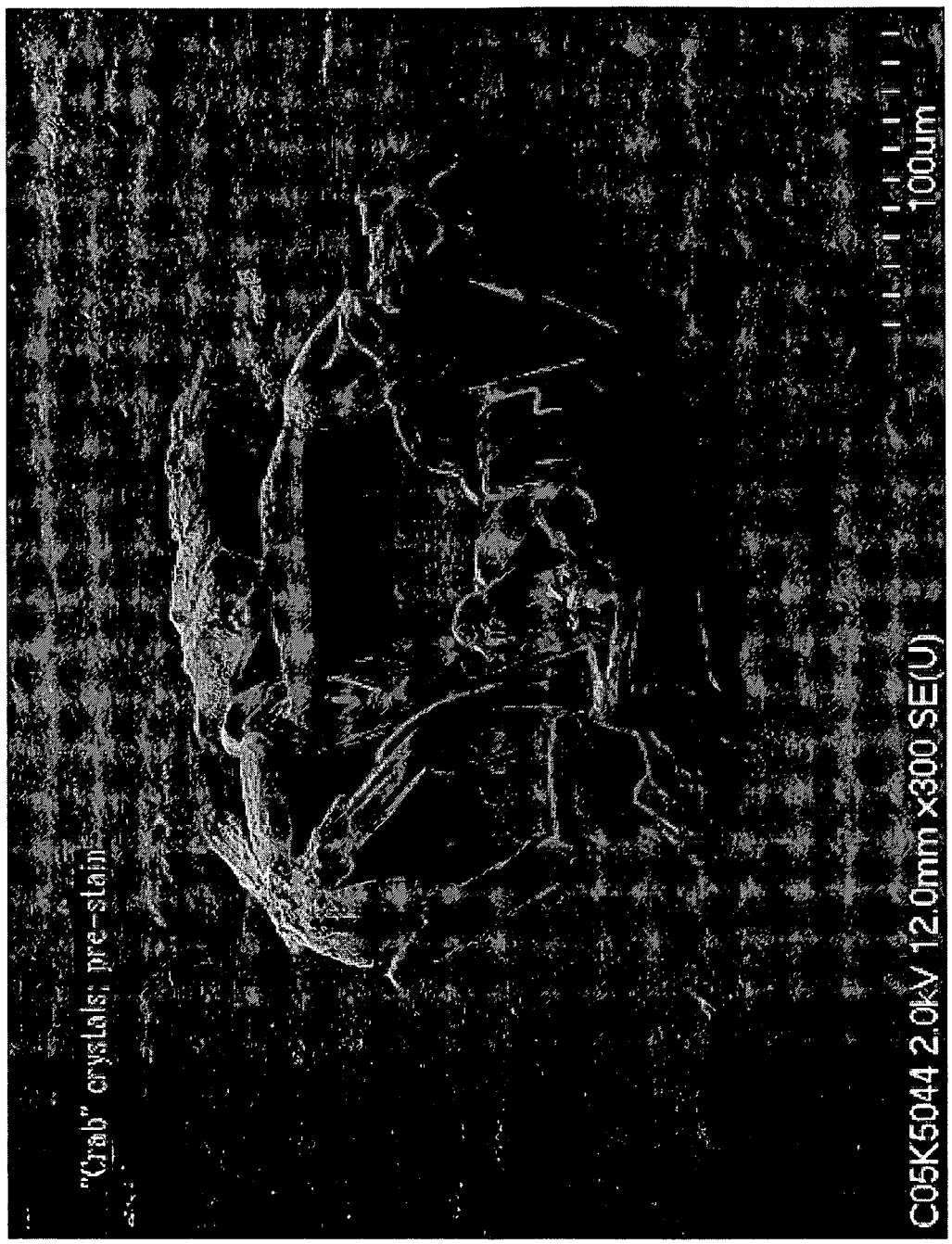
Fig._10

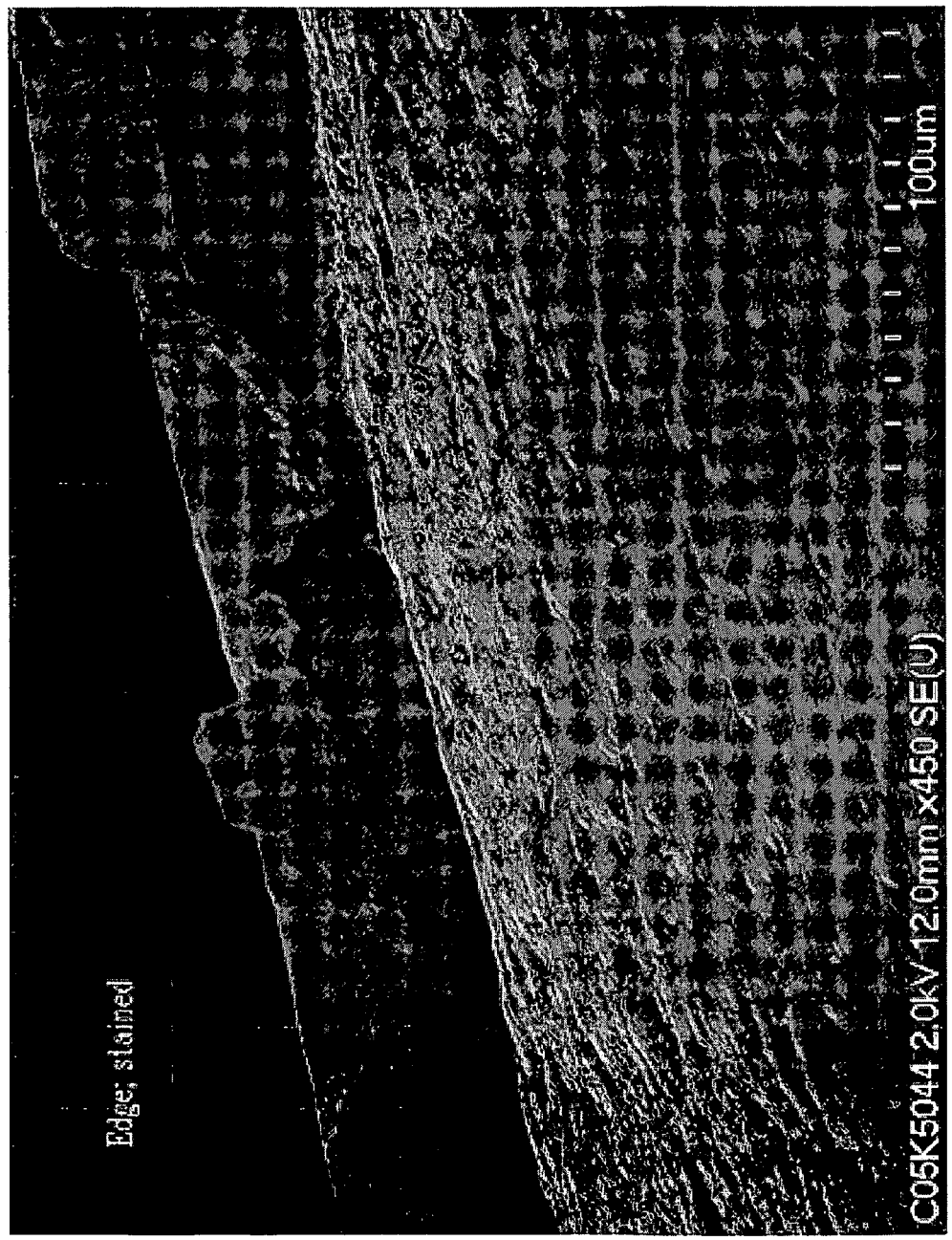
Fig._11

MATERIAL SURFACE TREATMENT METHOD USING CONCURRENT ELECTRICAL, VIBRATIONAL AND PHOTONIC STIMULATION

CROSS-REFERENCE TO RELATED APPLICATION

This application for patent claims priority under 35 U.S.C. 119(e) from U.S. provisional application No. 60/676,188, filed Apr. 29, 2005.

TECHNICAL FIELD

This invention relates to surface treatment of materials, and in particular relates to a method for changing the molecular bonds at or near the surface of a material and within a solution in order to facilitate certain desirable reactions. It also relates to energy generation, in particular, preparation of the surface of material to facilitate an exothermic reaction in a liquid medium.

BACKGROUND ART

The problem to be solved is to provide one means of sustaining an exothermic reaction in the throat of a nozzle such that a fluid medium can undergo a change in phase from an incompressible to a compressible liquid at that point. When thrusting laterally around a shaft, such a nozzle can be used to provide rotational drive. Such a nozzle is described in a prior U.S. patent application Ser. No. 10/797,255 of the present inventor, entitled "Implementation and Application of Phase Change in a Fluid Flowing Through A Nozzle".

SUMMARY DISCLOSURE

The invention is a protocol that prepares the surface of a material, such as palladium, for an exothermic reaction. The protocol consists of a specific series of steps applying compounded and concurrent electrical, photonic, and vibratory stimuli between palladium electrodes immersed in a solution containing lithium sulfate as an electrolyte and anionic silica hydride as a surfactant while that solution is maintained at an elevated temperature at or near the boiling point. The solution is buffered to a pH in the range of 6.5 to 8.9. After preparation of the surface, a final step of the protocol calls for stimulation of the cathode with a DC voltage.

The protocol shows evidence that the bonding of the palladium has changed at or near surface, for example, in that it will now stain with methylene blue. It also yields a sustained exothermic reaction at or near the boiling point of the solution.

BRIEF DESCRIPTION OF THE DRAWINGS

FIG. 1 is a photograph of two electrodes, the surfaces of which are in the final stages of being treated, immersed in an electrolytic cell and being stimulated in accord with the method of the present invention.

FIGS. 2 and 3 are graphs of voltage versus time for respective ramped and unramped forms of electrical stimulation applied to the electrodes in the arrangement of FIG. 1.

FIGS. 4, 5 and 6 are photographs of scanning electron microscope (SEM) images of electrodes treated in accord with the present invention. FIG. 4 shows 'volcanic' crater sites formed on the electrode surface. FIGS. 5 and 6 show silica coatings formed on two different electrodes, with the silica coatings having a stratified and sponge-like texture, respectively.

FIGS. 7 and 8 are photographs of SEM images respectively before and after staining with methylene blue of an electrode sample showing silica coating.

FIG. 9 is a photograph of the same sample after staining as in FIG. 8, but observed with an optical microscope.

FIGS. 10 and 11 are photographs taken of a magnetic spin bar used in the electrolytic cell of FIG. 1 for stirring the contents, respectively showing deposits of palladium electrode metal upon the Teflon™ (polytetrafluoroethylene or PTFE) coating of the spin bar together with alterations of the PTFE surface itself.

DETAILED DESCRIPTION

In order to improve the performance of other inventions, notably the aforementioned nozzle, a source of energy was sought that can be used as one means to release heat into a system. That heat source must be sufficiently robust to flash water into steam. Changing the phase of a fluid from liquid to gas further implies that the heat source must have a high energy density.

Based upon those requirements, a protocol has been developed that treats the surface of a material, such as that for the throat of a nozzle, in preparation for an exothermic reaction. The protocol is performed in an electrolytic cell consisting of two electrodes, composed for example of palladium, with material surfaces to be treated, immersed in a solution of heavy water ($D_2O$), lithium sulfate ($Li_2SO_4$), and a surfactant. Citric acid or some other pH-buffering agent is added to the solution to keep pH within a specified range. Alternatively, less active results have also been observed using light water ($H_2O$).

The electrolytic cell may be of any size needed to accommodate a work piece whose surface is to be treated by this protocol. The work piece or pieces to be treated are used as either one or both of the electrodes, which can be of any shape and size, such as that of a nozzle. It may be a solid metal or alloy, containing for example palladium, or may be metallically plated with the desired surface material. It may also be surface coated with other materials, such as silicates or polymers (such as polytetrafluoroethylene), with either the underlying metal or the coating or both to be treated by the protocol.

The protocol requires a few hours of sample preparation. After the sample has been prepared, the final step is to stimulate it with a voltage of 10 volts or more. That DC stimulus will cause the cathode in the cell to release energy in an exothermic reaction that flashes water into steam on the surface of the palladium cathode. The reaction occurs at or near (within 10° C.) the boiling point of the solution in the beaker. The reactions persist for several hours and the energy released is sufficiently robust as to yield vigorous bubbles of steam that are visible to the naked eye.

Prior to being treated with the protocol, the temperature in the beaker rises in a linear manner as it is heated on a hot plate until it reaches the boiling point. After being treated with the protocol, the rate of change of the temperature increases with a non-linear S-curve as the temperature of the solution approaches within 3° C. of the boiling point. The temperature stabilizes just below the boiling point when the heat carried away by the increasing flow of bubbles equals the heat being added by the hot plate and the cathode. The S-curve shape is caused by energy from the reaction supplementing the energy from the hot plate and increasing the temperature of the solution.

Once stimulated by the DC, the reaction will diminish if the temperature of the solution is lowered and return if it is raised again.

These bubbles will typically form continuously on the cathode when the temperature of the solution is within 1° C. of the boiling point. At temperatures between 1° C. and 3° C. below the boiling point, they tend to release in bursts. FIG. 1 is a photograph of two cathodes in a cell. The cathode on the right is releasing some bubbles that rise without changing size. The cathode on the left has just released a burst, and its bubbles are growing in size as they rise through the liquid. That increasing size indicates that the bubble separated from the cathode with superheated steam that continues to vaporize the surrounding water as it ascends through the liquid.

To verify that the bubbles were steam and not hydrogen, the temperature of an electrolytic cell with one anode and two untreated cathodes was raised to within 2° C. of its boiling point using a hotplate. Over a half-hour, the cell would maintain that temperature within a few tenths of a degree if the hotplate was kept at that initial setting. The untreated cathodes were replaced with two cathodes that had been treated with the protocol. The setting of the hotplate was raised to bring the cell to boiling and a DC voltage applied across the electrodes, as required by the protocol. After observing sustained bubbles rising from the surface of the palladium cathode, the plate was returned to its initial setting. In the absence of an exothermic reaction, one would have expected the temperature of the cell to fall back below the boiling point. It did not; it remained at or near the boiling point for several hours, showing evidence that a gap of approximately 1.5° C. was caused by heat being released within the cell.

The power required to create that temperature gap was determined by performing an empirical experiment, forcing a current through a resistor in the same beaker filled to the same level with the same liquid. Approximately five watts was needed to maintain that temperature gap. If the two cathodes were the only source of heat causing the gap, they would have had an energy density two orders of magnitude greater than that available from chemical batteries. However, it was later determined that palladium had deposited on the magnetic spin bar in the beaker, so the surface area of that palladium may have contributed as a heat source with the cathodes.

The temperature on the surface of the hotplate was measured with a thermocouple throughout this experiment to confirm that the surface temperature returned to the range of its earlier value after the plate was reset to the baseline; it did return to that range.

It is known that various kinds of stimuli, including electricity, vibration, and light, can initiate exothermic reactions. In this protocol, all three of these stimuli are used together in combination. Two of the three stimuli, electricity and vibration, are obtained in a single operation. Specifically, knowing that a percussion sound in audio electronics can be simulated by a series of pulses modulated by sine waves, a signal is created that combines elements of electrical stimulation and vibration, which is referred to as "ramped percussion modulation".

That stimulus is a time-varying voltage with a baseline near ground potential. It is shown in FIGS. 2 and 3 in a ramped and unramped form, respectively. Observations show that a 3.15 MHz pulse train modulated by a 50 MHz sine wave is effective.

This periodic electrical stimulus does not cause electrolysis. According to classic electrochemistry, alternating currents become ineffective for electrolysis above 400 kHz because the charge carriers of the electrolyte lag in their response to an electric field and no longer migrate between electrodes at high frequencies. Their mobility is limited by their diffusion times and rates and by the double-layer capacitance at the interface of the electrolyte and the electrodes. The pulse frequency of this stimulus is thus almost an order of magnitude too high to stimulate electrolysis, while the modulating sine wave is two orders of magnitude too high.

Further, the voltage levels in electrolysis must exceed a threshold voltage of approximately two volts to break the molecular bonds of the water molecule. While the peak value of the modulated stimulus used to prepare the surface of the cathode for exothermic reactions does exceed two volts, the average value will vary with the impedance across the electrodes and typically is less than half of that. A DC stimulus is applied during a later portion of the protocol, and it does exceed two volts. However, the exothermic reaction does not occur with the DC stimulus alone; the periodic electrical and photonic stimuli are also required.

Finally, bubbles are not generated when this stimulus prepares the surface of the palladium cathode, further suggesting that electrolysis is not occurring.

One objective of the experiments was to test whether a surfactant would facilitate exothermic reaction by changing the conditions at the interface between the cathode and the electrolytic solution. To the best of our knowledge, previous attempts to use surfactants to create exothermic reactions in electrolytic cells have only served to demonstrate that the surfactants contaminate the surface of the electrodes and inhibit the reactions. Significantly, surfactants are typically hydrocarbon chains with a "surfactant tail" that can be twelve or more carbon atoms long. An embodiment of the protocol in accord with the present invention uses either of two commercial products called "MegaH–" and "Super Hydrate". These commercial products are marketed as dietary supplements for human consumption and are the inventions of Dr. Patrick Flanagan of Watsonville, Calif. They are respectively the powdered and dissolved form of his anionic silica hydride.

Super Hydrate was originally selected because of its surfactant properties. It is reported to lower surface tension in water from 78 to 49 dynes/cm$^2$, and it does not have a surfactant tail. The following additional points can be made about these two products: 1) They are described as sources of ionized hydrogen contained within soluble "proprietary microclusters" of silica hydride. 2) This technology is further described in an article published by Drs. Stephanson and Flanagan in the International Journal of Hydrogen Energy in 2003. The article is titled "Synthesis of a novel anionic hydride organosiloxane presenting biochemical properties." The article can be found at the following URL: http://www-.megahydrate.com/IJHE_28_11_2003.pdf. 3) Anionic silica hydride is described in the article as consisting of tetrahedral frameworks that encapsulate hydrogen cations. 4) Drs. Stephanson and Flanagan further describe their anionic silica hydride as a silsequioxane, a class of organo-siliceous compounds with the general formula $(RSiO_{1.5})_n$, where n is an even number and the R constituent group may be one of any number of functional groups. They report that evidence in their analysis suggests that their product has hydroxyl-terminated constituents. 5) In another article Dr. Flanagan indicates that he has applied for a patent on his invention. 6) Both products also contain additives to enhance flavor (irrelevant to the present invention) and to improve handling qualities such as pourability. Pure samples of the products without the additives were not available and the influence of these additives could not be determined. They could either be facilitating the reactions, be inhibiting them, or be neutral in the protocol. 7) According to is package label, Mega H— has potassium citrate, potassium carbonate, and oleic acid added.

8) Super Hydride has potassium carbonate, magnesium sulfate, and oleic acid added. Some of these additives may have a pH buffering affect. Subsequent experiments showed success using MegaH— alone, so the dissolved form is optional.

To the best of our knowledge, pH is not a critical variable in electrolysis. However, it is a critical issue for exothermic reactions in this protocol. The reaction protocol works if the pH of the solution is between 6.5 and 8.9. A pH of 8.0 is recommended for the protocol.

Hydrogen and helium gases were bubbled into the cell while preparing the sample to keep it saturated with those gases. Later, the hydrogen gas was eliminated and some effect still observed, so the hydrogen gas can be considered optional.

In order to find evidence that very high temperatures were reached during the protocol, the cathodes used in these experiments were examined with electron microscopy at analytical testing laboratories. Samples were tested at Accurel Systems International Corp. and Charles Evans & Associates, both in Sunnyvale, Calif.

One early cathode was examined with a Scanning Electron Microscope (SEM). A coating of silica covered the surface of the cathode where it had been immersed in the liquid. Some of the silica had been rubbed off during handling, exposing the palladium surface underneath. Several 'volcanic' sites were observed on the metal surface, as shown in FIG. 4. These sites showed craters that appear to have been formed by very intense, localized heat. The sites feature cones that resemble volcanoes where material has been ejected, leaving a cone that appeared to have been formed by ejected material and signs of sputtering around that cone. Subsequent cross-sectional examinations of other samples showed lateral views of similar sites and confirmed their conical shape. An untreated sample was examined, and no volcanic sites were observed on it.

A second sample showed some different phenomenon. This second sample came from an experiment conducted on Mar. 17, 2005, and tested the next day, Mar. 18, 2005. It was kept under a helium blanket between the experiment and analysis. During FIB preparation of the sample, it was observed that the silica coating had separated completely from the palladium substrate, as shown in FIG. 5. There was a continuous gap between the palladium and the silica. The cross section of the silica showed a rough external surface, an amorphous layer of silica, and an inner layer of poorly organized crystalline formations whose appearance suggests high temperatures were present in their formation. The various strata revealed by the SEM show that the coating cooled differentially, more quickly at the outer surface and slower near the palladium wire. As it cooled, it formed different crystalline morphologies. In that regard, the strata resemble a geode, commonly called a "dinosaur egg", another object believed to be formed with extreme heat.

A third sample was tested on April 26 and 27 at the same laboratory. This sample had appeared to have shown more robust heat than the second. The coating in this sample showed a sponge-like texture rather than strata, as shown in FIG. 6. Electron diffraction microscopy (EDS) showed that coating to be binary mixture consisting entirely of oxygen and silicon.

A fifth sample was tested later after being prepared for microscopy in a different way. This sample was cross-sectioned and polished rather cut with a Focused Ion Beam (FIB). The silica coating on this sample shows clearly as a band approximately 80 nm deep around the cathode in FIG. 7. In an effort to highlight features in this sample, it was stained with methylene blue. Materials engineering specialists had stated that staining a metal would not reveal any additional information in the analysis. In fact, staining is generally only used on organic samples. However, distinct differences were observed as a result of staining. FIG. 8 shows the same sample as FIG. 7 after staining. One clearly sees a band within the cathode outer surface that has been preferentially stained. The band varied between 1 µm and 2.5 µm in depth.

Examining the same sample with an optical microscope showed something else interesting, as shown in FIG. 9. There are patches deep within the palladium where the stain adheres to the metal, giving it a mottled appearance. Examination of an untreated sample did not show such patches.

Continued work with the protocol led to another observation. While preparing the samples, the contents of the beaker were stirred using a magnetic spin bar. The spin bars used in the experiments demonstrated a tendency to generate more steam bubbles as they were used in successive tests, so one was examined with a SEM. Following usual procedure, the operator placed the spin bar in a vacuum chamber and attempted to coat it electrostatically with conductive platinum, a standard procedure in the preparation of such samples. The spin bar promptly slammed against the electromagnet and was damaged. However, the damaged sample showed some interesting results. The surface showed numerous deposits of palladium, such as the one shown in FIG. 10. The spin bar is a magnet coated with Teflon™, and a layer of material had been lifted off the surface of the Teflon and peeled back, as shown in FIG. 11. It appeared that the surface of the spin bar was affected in some manner by the protocol and that it is susceptible to spalding as shown in the photograph. Of particular interest are the fibrous threads that connect the layers. These threads have a distinctly organic appearance, resembling tissue.

Taken together, the facts that the palladium will take methylene blue stain, that the Teflon behaves differently at or near its surface where it has been treated with the protocol, and that a sustained exothermic reaction occurs at its surface demonstrate that the chemical bonding at the surface of both the palladium and the Teflon have been affected by the protocol.

The data presented above indicates that the electrical-vibratory stimuli are penetrating to the surface of the cathode and affecting it there during the protocol. However, as also stated above, the charge carriers of the electrolyte lag in their response to electric fields varying at the frequencies of the stimuli used in the protocol and no longer migrate between electrodes for the reasons given. The question then arises, how are the electrons penetrating to the surface of the cathode in this protocol?

One possibility is that the combination of electrical, vibrational and photonic stimulation of the electrodes and electrolyte somehow affects the electrons' wave-particle quality. Quantum tunneling permits transitions through classically forbidden energy states, in this case, the double-layer capacitance at the interface of the palladium and the electrolytic solution. That tunneling effect relies upon the wavelike behavior of a particle, in this case, the electron.

This protocol appears to be inducing a shift in the behavior of the electrons from particle- to wave-dominated behavior. The protocol is clearly sensitive to the frequencies of both the pulse train and the sine-wave modulation, suggesting that some resonance is involved. Further, it was observed that magnetism interferes with the protocol, suggesting that magnetism disrupts some interaction with the electromagnetic field of the electron during the protocol. Such a change in the electron's behavior implies that a quantum effect has been induced by the protocol. Alternatively, the protocol modifies the surface of the electrode in order to facilitate electronic tunneling.

Given the scope of the effects, the quantum tunneling induced by the protocol is neither isolated nor random; it occurs with massive regularity.

The specific steps of the protocol are shown below:

Step 1. Prepare a solution beginning with 25 ml of heavy water ($D_2O$) in a beaker. Add 1.4 g of Lithium Sulfate Monohydrate ($Li_2SO_4.H_2O$). Add 100 mg anionic silica hydride in the form of "MegaH–" and 0.45 ml (twenty drops) of "Super Hydrate". Alternatively, one can use an unadulterated form of anionic silica hydride in equivalent amounts, if available.

Step 2. Then heat the solution above 90° C. on a hot plate and maintain the temperature below the boiling point for 30 minutes. Stir or swirl gently. Optionally, use a magnetic stirrer for this step; implicitly, this will subject the solution to a time-varying magnetic field. At the beginning of this interval the solution has soapy bubbles on its surface, as one would expect with a surfactant. At the end of the period the surface is clear of bubbles, or nearly so.

Step 3. Then add sufficient citric acid solution to lower pH to 8.0. The protocol requires pH be maintained between 6.5 and 8.9.

Step 4. Then condition the surface of, e.g., a palladium wire with the following process: Immerse 1 cm of a palladium wire into the solution described above as a cathode. Immerse a second palladium as an anode into the same solution to the same depth and parallel to it at a distance of 1.7 cm. Stimulate the electrodes and the gap between them for three hours with a time-varying electrical signal having the following characteristics: A series of seven pulses having a baseline at ground potential and increasing in approximately equal increments from 1.2 Volts to 6.9 Volts into a 1 M Ω impedance with a pulse repetition rate of 3.15 MHz, or a period of ~317 ns. Each pulse is modulated with a sine wave of 50 MHz with peak-to-peak amplitude of 2 Volts. The pulse duty cycle is 50%. The pulse train increases in amplitude in a pattern of excitation followed by a period of relaxation of ~1.6 ms. Then the pulse train repeats indefinitely. These pulses were generated with a Tektronix model AWG 2021 arbitrary waveform generator. When this stimulus is applied to the electrodes, the impedance across them will be less than the 1 M Ω specified above. It will also be more complex than the controlled impedance of an oscilloscope input. The signal will therefore have less amplitude across the electrodes and exhibit ringing. Simultaneously stimulate the electrodes and the gap between them photonically with two banks of five white LEDs with the part number SBW6018 and a maximum luminous intensity of 6,000 mcd each; they were purchased at Halted Electronics in Sunnyvale, Calif. The LEDs are pulse-modulated by frequency-hopping through the following six frequencies, dwelling at each for five minutes: 464; 1,234; 1,289; 2,008; 3,176; and 5,000 Hz with 50% duty cycles. Bubble helium and hydrogen gases into the solution to saturate it with those gases continuously at the rate of one or two bubbles per second while providing the electrical and photonic stimuli. Optionally, the hydrogen gas can be eliminated. Continue stimulating concurrently with both electrical and photonic stimuli at an elevated temperature of between 90° C. and the boiling point for three hours. Then add an additional 500 mg of Lithium Sulfate Monohydrate and apply a 10V DC across the electrodes for two hours while maintaining the temperature of the liquid in the beaker between 90° C. and 95° C. You should see gas bubbles forming on both the cathode and the anode as a result of electrolysis.

Step 5. Then initiate the exothermic reaction: Continue to bubble helium and hydrogen gases into the solution to maintain saturation with those gases. Continue to illuminate the cathode with two banks of white LEDs pulsed at 464 Hz and impose the 10-volt DC voltage across the electrodes. Raise the setting on the hot plate to increase the temperature of the solution. The bubbles will become more vigorous as the temperature approaches the boiling point. Raise the temperature of the solution to within 1° C. the boiling point. Typically, there will be a burst of bubbles on the cathode as the exothermic reaction initiates. Maintain the temperature within 3° C. of the boiling point.

Step 6. Then remove the DC voltage, the photonic stimulation, and the supply of gases. The bubbles on the anode will cease since there is now no electrolysis. Since the electrolysis will have loaded the palladium with hydrogen, the bubbles on the cathode will initially consist of both hydrogen gas and steam. The hydrogen will be depleted within tens of minutes. If the bubbles decrease, raise the temperature to within 1° C. of the boiling point and reapply the DC voltage momentarily. The exothermic reaction should start again and persist after the voltage is removed. Sustain the reaction by reapplying the voltage in this manner.

Some things have been observed that tend to inhibit this protocol during experiments, and the following cautions are offered to anyone attempting to duplicate it: 1) Use care when handling all parts of the apparatus that will be in contact with the solution. Fingerprints and other contamination inhibit the process. Using rubber gloves is recommended whenever handling the apparatus. Likewise, the apparatus should be cleaned before each run, by rinsing it with alcohol, hydrogen peroxide, and distilled water. 2) Avoid the use of metals that might readily dissolve in or chemically react with the electrolytic solution. At one point, the apparatus included copper, and that quenched the reaction. Palladium is one metal that is not chemically reactive in electrolyte and thus can treated by this protocol. 3) Avoid using a hot plate that is also a magnetic stirrer other than in Step 2 above. Results improved with a Corning ceramic hot plate Model PC 200. It appears that magnetism may interfere with the stimuli.

The invention claimed is:

1. A method of preparing materials at or near their surfaces, comprising:
    preparing a solution in water of an electrolyte, a surfactant, and a pH-adjusting agent to maintain the pH of the solution between 6.5 and 8.9;
    heating and maintaining the solution at an elevated temperature at or just below its boiling point;
    immersing a pair of metallic electrodes to be surface-treated with a gap therebetween into the solution;
    electrically and vibrationally stimulating the electrodes over an extended time period by applying a voltage between the electrodes as a series of pulses; and
    photonically stimulating the solution with illumination from a light source, simultaneously with the electrical and vibrational stimulation of the electrodes.

2. The method as in claim 1, wherein the water is predominantly heavy water ($D_2O$).

3. The method as in claim 1, wherein the water is predominantly light water ($H_2O$).

4. The method as in claim 1, wherein the electrolyte comprises a lithium salt.

5. The method as in claim 4, wherein the lithium salt is lithium sulfate ($Li_2SO_4$).

6. The method as in claim 1, wherein the surfactant comprises an anionic silica hydride.

7. The method as in claim 6, wherein the anionic silica hydride comprises a silsesquioxane composition with a hydride-embedded siliceous cage structure forming a source of anionic hydrogen ($H^-$).

8. The method as in claim 6, wherein the hydride is a deuteride.

9. The method as in claim 1, wherein the pH-adjusting agent comprises citric acid.

10. The method as in claim 1, wherein the elevated temperature is in excess of 90° C.

11. The method as in claim 1, further comprising bubbling helium gas through the solution to saturation prior to and during the electrical and photonic stimulating.

12. The method as in claim 1, further comprising bubbling hydrogen gas through the solution to saturation prior to and during the electrical and photonic stimulating.

13. The method as in claim 12, wherein the hydrogen gas is deuterium gas.

14. The method as in claim 1, further comprising physically stirring the solution during the electrical and photonic stimulating.

15. The method as in claim 1, wherein the metallic electrodes are in the form of wires.

16. The method as in claim 1, wherein the metallic electrodes comprise palladium or an alloy thereof.

17. The method as in claim 1, wherein the extended time period of electrical, vibrational and photonic stimulating is in a range from 1 to 24 hours.

18. The method as in claim 1, wherein the series of pulses have a pulse repetition rate in a radio frequency range in excess of 400 kHz.

19. The method as in claim 1, wherein each of the pulses has a superimposed voltage modulation at a frequency at least 10× greater than the pulse repetition rate.

20. The method as in claim 19, wherein the voltage modulation superimposed upon each pulse has a modulation amplitude not exceeding the baseline voltage of that pulse.

21. The method as in claim 19, wherein the series of pulses are voltage-modulated pulses with a pulse repetition rate of 2.5 to 4 MHz and a superimposed sinusoidal amplitude modulation with a frequency of 40 to 60 MHz.

22. The method as in claim 1, wherein the series of pulses have a sawtooth envelope with ramped sequences of pulses incrementally increasing in voltage.

23. The method as in claim 22, wherein the series of pulses also include a relaxation period of non-ramped pulses between each ramped sequence of pulses.

24. The method as in claim 1, wherein the vibratory stimulation is presented as a modulation of the electrical stimulus.

25. The method as in claim 1, wherein the series of intensity-modulated light pulses is provided from a set of pulse-modulated light-emitting diodes (LEDs).

26. The method as in claim 25, wherein the LEDs are modulated.

27. The method as in claim 26, wherein the modulated LEDs are modulated with a pulse repetition rate that frequency hops at successive intervals.

28. The method as in claim 1, wherein the combination of electrical, vibrational and photonic stimulating of the electrode and electrolytic solution stimulates a quantum effect in the electrons as they migrate across the solution toward the electrode by affecting their wave-particle duality.

29. The method as in claim 1, wherein the combination of electrical, vibrational and photonic stimulating of the electrode and electrolytic solution modifies the surface of the electrode so as to facilitate electron tunneling.

* * * * *